United States Patent [19]
Matsumura et al.

[11] Patent Number: 5,908,684
[45] Date of Patent: Jun. 1, 1999

[54] MAGNETIC RECORDING MEDIUM

[75] Inventors: Shinichi Matsumura; Satoshi Sato, both of Miyagi, Japan

[73] Assignee: Sony Corporation, Tokyo, Japan

[21] Appl. No.: 08/991,529

[22] Filed: Dec. 16, 1997

[30] Foreign Application Priority Data

Dec. 20, 1996 [JP] Japan .................................. 8-341574

[51] Int. Cl.$^6$ .................................................. G11B 5/704
[52] U.S. Cl. ........................ 428/141; 428/216; 428/336; 428/694 TB; 428/694 SG; 428/900
[58] Field of Search ................................... 428/141, 216, 428/336, 694 TB, 694 SG, 900

[56] References Cited

U.S. PATENT DOCUMENTS

| 5,419,942 | 5/1995 | Masuda et al. | 428/141 |
| 5,670,236 | 9/1997 | Kotani et al. | 428/141 |

Primary Examiner—Stevan A. Resan
Attorney, Agent, or Firm—Hill & Simpson

[57] ABSTRACT

A magnetic recording medium capable of realizing satisfactory workability in a process for manufacturing a non-magnetic support member and the magnetic recording medium, preventing deterioration in the surface characteristic of the magnetic layer caused from transcription of the reverse side so that both excellent electromagnetic conversion characteristic and moving easiness are realized. The magnetic recording medium has a non-magnetic support member; and a magnetic layer in the form of a thin metal magnetic film formed on the non-magnetic support member, wherein the non-magnetic support member is in the form of a laminate composed of a plurality of layers, the magnetic layer is formed on a first layer of the plural layers, and the surface roughness of a surface of a second layer opposite to the surface of the second layer on which the first layer is formed is made in such a way that SRa=3 nm to 12 nm and SRz=40 nm to 300 nm.

9 Claims, 4 Drawing Sheets

MAGNETIC RECORDING MEDIUM

BACKGROUND OF THE INVENTION

1. Field of the Invention

The present invention relates to a magnetic recording medium having a structure that a magnetic layer made of a metal magnetic film is formed on a non-magnetic support member thereof to serve as a magnetic tape or a magnetic disk with which a short-wavelength magnetic recording signal can satisfactorily be recorded and reproduced (a dense recording can be performed) to serves as, for example, a high-band 8-mm video tape, a digital video tape or the like.

2. Description of the Related Art

A so-called ferromagnetic thin metal film type magnetic recording medium has a thin film made of alloy or an oxide of iron, cobalt, nickel or their combination and formed, on a non-magnetic support member thereof, by a vacuum film forming method, that is a PVD (Physical Vapor Deposition) method, such as a vacuum evaporation method, a sputtering method or an ion plating method. The ferromagnetic thin metal film type magnetic recording medium, containing no binder, enables the recording density to significantly be improved as compared with a so-called coating-type magnetic recording medium which is manufactured by coating a non-magnetic support member with a magnetic coating containing metal magnetic powder dispersed in a binder and by drying the magnetic coating. However, the above-mentioned improvement in the recording density (that is, raising the density) requires minimization of a spacing loss by reducing the magnetic gap of the magnetic recording head and by flattening and smoothing the surface of the magnetic recording medium.

If the surface of the non-magnetic support member is excessively flattened and smoothed in a case where the non-magnetic support member has a usual single layer structure, the sliding smoothness (the moving easiness) deteriorates and adhesion takes place. In this case, there arises a problem in that the workability (the handling easiness) deteriorates.

As a method which is capable of overcoming the above-mentioned problem, a method is known which has the steps of forming (applying) another layer on a surface of the single layer structure non-magnetic support member opposite to the surface on which the magnetic layer is formed and making the formed surface to be a relatively rough surface. However, the above-mentioned method suffers from the coating layer being easily cut, thus resulting in cut chips causing dropout to take place.

To overcome the above-mentioned problem, an attempt has been made to improve the sliding smoothness (the handling easiness) by employing a structure that the non-magnetic support member is formed into a laminate (a so-called composite film) composed of a plurality of layers and the roughness of a surface (the reverse side) of the non-magnetic support member opposite to a surface of the same, on which the ferromagnetic thin metal film will be formed, is made to be coarse.

Recently, elongation of permissible recording time, denser recording and larger quantity of information have been required. To elongate the recording time and enlarge the quantity of information, the overall thickness of the magnetic recording medium (in particular, a magnetic tape) must be reduced to increase the number of winding times around a reel so as to elongate the overall length of the magnetic recording medium which is accommodated in a cassette. It leads to a fact that a non-magnetic support member having a considerably reduced thickness as compared with the conventional non-magnetic support member has been employed.

However, a non-magnetic support member, such as the above-mentioned composite film, usually has a structure that the surface roughness of the surface, on which the magnetic layer will be formed, and that of the opposite surface (the reverse side) are different from each other. Therefore, when the magnetic recording medium is wound into a roll form, the reverse side of the non-magnetic support member and the right side (the surface) of the same are strongly pressed against each other. As a result, influences, such as undesirable printing and transcription of the reverse side, are exerted upon the surface, on which the magnetic layer will be formed, thus causing the surface roughness of the surface, on which the magnetic layer will be formed, to easily deteriorate. When a magnetic layer is formed on a non-magnetic support member of the foregoing type so that a tape medium is manufactured, the surface of the magnetic layer is directly affected by the influence of the roughness of the reverse side of the non-magnetic support member and thus the roughness of the reverse side is transferred. In this case designed surface roughness of the surface of the magnetic layer cannot be realized and the surface roughness sometimes deteriorates.

In recent years digitization of recording signals has been intended and research and development of digital signal processing apparatus have energetically been performed.

A recording/reproducing method (a digital method) using a digital signal process is able to compress and correct a signal, to be recorded, by using a mathematical method and thus the digital method has information processing performance decidedly superior to that of the conventional analog method. Therefore, the above-mentioned recording/reproducing method is expected to be further developed because it is capable of significantly improving the sound quality and image quality and enabling long recording time to be realized when sound or an image is recorded if the above-mentioned structure is adapted to a digital VTR apparatus.

Among digital type mediums, a magnetic recording medium, such as a DVC (a home digital video), must be adapted to high frequency recording (a shortened recording wavelength) to perform dense recording and accurate recording free from lacking of signals. Therefore, the relative velocity between the magnetic recording medium and the magnetic head has been required to be raised. In addition to raising the relative velocity, elongation of the recording time and enlargement of the quantity of information have been required. Under the above-mentioned circumstance, reduction in the magnetic tape to enable a longer magnetic tape to be accommodated and to elongate the magnetic tape has been required.

In particular, a magnetic tape of a type having the structure that the above-mentioned thin metal magnetic film is formed on a non-magnetic support member has superior coercive force and square ratio to those of a coating-type magnetic tape and the thickness of the magnetic layer can significantly be reduced. Thus, a variety of advantages can be realized in that demagnetization of recorded signals and thickness loss occurring during a reproducing operation can significantly be prevented, an excellent electromagnetic conversion characteristic at short wavelengths can be obtained and the packing density of a magnetic material can be raised. Therefore, the magnetic tape of the foregoing type is significantly be advantageous to serve as a medium, such as the DVC, for use in a digital process.

However, a very thin magnetic recording medium including a thin non-magnetic support member and, in particular, having a thickness of 8 μm or smaller usually has difficulty in realizing a satisfactory handling easiness (workability) because adhesion of the non-magnetic support member takes place easily. Investigations of the DVC including a non-magnetic support member having a thickness of 8 μm or smaller (having a thickness of 6 μm) which is considerably smaller than that of the usual video tape (having a thickness of about 10 μm or larger) have been made. As a result, excessive transcription to the right side takes place when the reverse side of the non-magnetic support member is made to be rough in order to improve the handling characteristic (the workability) after the magnetic tape has been wound into a roll. Thus, the electromagnetic conversion characteristic deteriorates excessively. Therefore, if the non-magnetic support member has a small thickness, improvement in the electromagnetic conversion characteristic cannot easily be made to be compatible with realization of the handling characteristic (the workability).

Accordingly, achievement of satisfactory workability in the processes for manufacturing the non-magnetic support member and the magnetic recording medium and prevention of deterioration in the surface characteristics of the magnetic layer occurring attributable to undesirable transcription of the reverse side and printing are required to make a satisfactory electromagnetic conversion characteristic to be compatible with the moving characteristic.

SUMMARY OF THE INVENTION

In view of the foregoing, an object of the present invention is to provide a magnetic recording medium having a magnetic layer in the form of a thin metal magnetic film and capable of realizing both excellent electromagnetic conversion characteristic and moving characteristic by realizing satisfactory workability in the processes for manufacturing the non-magnetic support member and the magnetic recording medium and by preventing deterioration in the surface characteristic of the magnetic layer occurring attributable to undesirable transcription of the reverse side and printing.

The inventors of the present invention have energetically developed and researched magnetic recording media which are capable of realizing both satisfactory handling characteristic and excellent electromagnetic conversion characteristic. As a result, a fact was found that a structure having a non-magnetic support member formed into a laminate (a so-called composite film) consisting of at least two layers and arranged in such a way that the thickness of a layer of the non-magnetic support member opposite to a layer on which, for example, a magnetic layer will be formed, is reduced and particles (a filler) in an appropriate quantity are contained in the thin layer to control the surface characteristic of the surface, on which the magnetic layer will be formed, enables a non-magnetic support member and a magnetic recording medium capable of satisfying the above-mentioned two characteristics to be realized even if the non-magnetic support member has a small thickness. Thus, the present invention was established.

That is, according to one aspect of the present invention, there is provided a magnetic recording medium (hereinafter called a magnetic recording medium according to the present invention) including a magnetic layer in the form of a thin metal magnetic film formed of a non-magnetic support member thereof, wherein the non-magnetic support member is in the form of a laminate composed of a plurality of layers, the magnetic layer is formed on a first layer and surface roughness of a second layer opposite to the surface on which the first layer is formed is made in such a way that SRa=3 nm to 12 nm and SRz=40 nm to 300 nm.

The magnetic recording medium according to the present invention has the structure that the non-magnetic support member is composed of a laminate consisting of the first and second layers, the magnetic layer is formed on the first layer and the surface roughness of the second layer opposite to the surface, on which the first layer is formed is made in such a way that SRa=3 nm to 12 nm and SRz=40 nm to 300 nm. Therefore, the state of the surface of the second layer can appropriately be adjusted thanks to the surface roughness indicated with SRa and projections indicated with SRz. Even if the non-magnetic support member has a very small thickness of 8 μm or smaller, adhesion occurring in the processes for manufacturing the non-magnetic support member and the magnetic recording medium can be prevented and satisfactory workability (the handling characteristic) can be realized. In addition, deterioration in the surface characteristic of the magnetic layer occurring attributable to transcription of the reverse side to the surface of the magnetic layer and printing caused from the surface roughness of the second layer can be prevented after the non-magnetic support member and the magnetic recording medium have been wound into a roll form. As a result, a magnetic recording medium having excellent workability, a satisfactory moving characteristic and a required electromagnetic conversion characteristic and including the thin metal magnetic film type magnetic layer can be provided. It is preferable that SRa be 5 nm to 10 nm and SRz be 40 nm to 150 nm.

An example 10 of the structure of the magnetic recording medium according to the present invention is shown in FIG. 4. As shown in FIG. 4, a non-magnetic support member 1 in the form of a laminate composed of a layer 1a (corresponding to the first layer) and a layer 1b (corresponding to the second layer). A magnetic layer 2 serving as a thin metal magnetic film is formed on the layer 1a. The surface roughness of a surface 5 of the layer 1b opposite to a surface 7 on which the layer 1a is formed (that is, opposite to the layer 1a) is made in such a way that SRa=3 nm to 12 nm and SRz is 40 nm to 300 nm (hereinafter applied to the following description).

The surface roughness SRa indicates the average roughness on a center line in a three dimensional space, while the surface roughness SRz indicates the average roughness of ten points in the three dimensional space. The surface roughness SRa and the surface roughness SRz can be obtained by using a surface roughness meter "ET-30HK" manufactured by Kosaka under condition that the diameter of a probe is 2 μmR, the pressure of the probe is 10 mg, the cutoff value is 0.25 mm, the x-directional measuring length is 0.8 mm and the y-directional measuring length is 0.02 μm (hereinafter applied to the following description).

The surface roughness SRa and the surface roughness SRz will now be described. Assuming that the x-directional and y-directional dimensions are Lx and Ly and the roughness curved surface with respect to the central surface is f (x, y), SRa (the three dimensional average roughness) is expressed as follows:

$$SRa = \int_0^{Lx} \int_0^{Ly} |f(x,y)| dx dy$$

The adjusted roughness is used to improve the surface condition (the moving characteristic and the like) of the second layer can be improved. The surface roughness SRz (the average roughness of ten points in the three dimensional space) indicates the difference between the average height of crests having first to fifth heights on a plane which is in parallel to an average surface of a portion obtained by cutting the reference area from the roughness curved surface and the average depth of troughs having first to fifth depths. The surface roughness SRz is employed to improve the surface state (transcription of the reverse side and the like) of the second layer by using the projections.

Other objects, features and advantages of the invention will be evident from the following detailed description of the preferred embodiments described in conjunction with the attached drawings.

DETAILED DESCRIPTION OF THE PREFERRED EMBODIMENTS

The structure of a magnetic recording medium according to the present invention easily enables the thickness of a non-magnetic support member thereof to be reduced to 8 µm or smaller. When a non-magnetic support member having the above-mentioned very small thickness, a great effect can be obtained. The structure of the present invention is satisfactorily adapted to a magnetic recording medium represented by a DVC (home digital video), the overall thickness of which is required to be reduced as much as possible.

When the thickness of the non-magnetic support member is reduced to 8 µm or smaller, the overall thickness of the magnetic recording medium can be reduced. As a result, the overall length of the magnetic recording medium, which is wound around a reel to be accommodated, can be elongated (that is, a long tape can be realized). Therefore, satisfactory long recording time and sufficient large quantity of information can be realized. It is preferable that the lower limit for the thickness of the non-magnetic support member be about 3 µm. If the thickness is smaller than 3 µm, the durability of the non-magnetic support member sometimes deteriorates.

The non-magnetic support member of the magnetic recording medium according to the present invention may be made of a known material.

For example, the material may be any one of the following polymer materials including polyester, such as polyethylene terephthalate or polyethylene-2, 6-naphthalate, polyolefin, such as polyethylene or polypropylene, cellulose derivative, such as nitrocellulose, cellulose triacetate, cellulose diacetate or cellulose triacetatebutyrate, vinyl resin, such as polyvinyl chloride or polyvinylidene chloride, polycarbonate, polyamide and polyimide. Moreover, the shape of the non-magnetic support member is not limited. For example, any one of a tape shape, a sheet shape and a drum shape may be employed.

The non-magnetic support member of the magnetic recording medium according to the present invention is a film formed by a known method using the foregoing polymer compound (that is, a film formed by melting and extruding the polymer compound into a sheet shape or a cylindrical shape, after which the extruded polymer compound is elongated into at least one direction). It is preferable that the non-magnetic support member is of a usual balance type, a type reinforced in the direction of the axis of the machine, a type reinforced in a direction perpendicular to the axis or a type reinforced in two directions.

Figure 4:
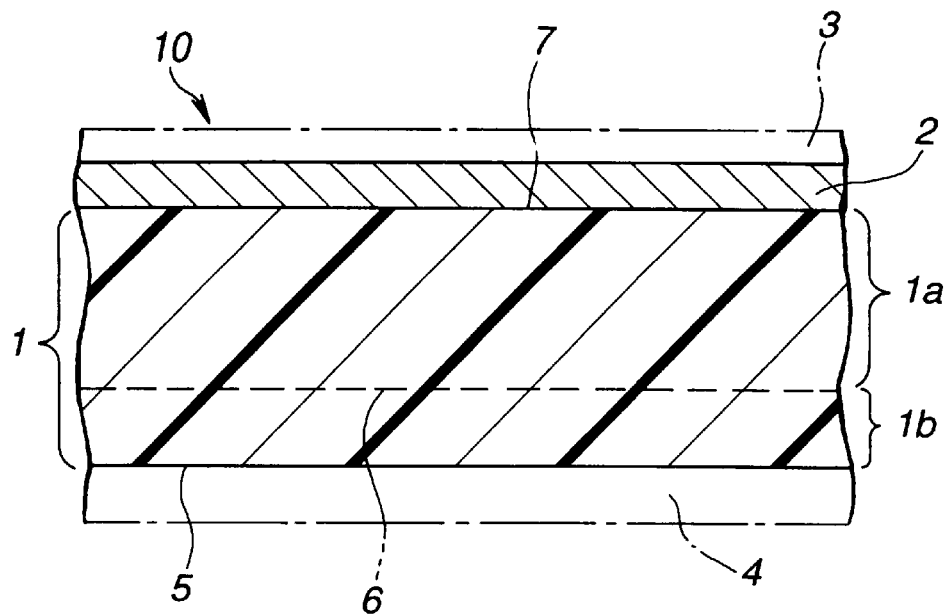
FIG. 4 is a schematic cross sectional view showing an example of a magnetic recording medium according to the present invention.

The magnetic recording medium according to the present invention and having the non-magnetic support member 1 formed into a composite film composed of the layers 1$a$ and 1$b$ as shown in FIG. 4 may be a composite film in the form of a laminate formed by stacking three or more layers. Any of the foregoing laminates is included in the scope of the non-magnetic support member of the magnetic recording medium according to the present invention.

It is preferable that the laminate be a composite film formed by the melting and extruding method which is performed simultaneously with manufacture of the non-magnetic support member. Note that a clear boundary does not exist between the layer 1$a$ and the layer 1$b$ as indicated with a dashed line 6 shown in FIG. 4 if the layer 1$a$ and the layer 1$b$ of the composite film are made of the same material. The obscure boundary is a region in which components of the respective layers mixedly exist. The layer 1$a$ and the layer 1$b$ are clearly distinguished from each other.

Although two layers 1$a$ and 1$b$ of the non-magnetic support member may be simultaneously manufactured by the melting and extruding method, another layer may be formed by coating or the like after the other layer has been formed. However, it is preferable that the layers are simultaneously (by, for example, the melting and extruding method) manufactured to improve the adhesivity between the layers and the productivity.

Although the surface roughness SRa and the surface roughness SRz of the surface (for example, the surface 5 shown in FIG. 4) of the magnetic recording medium according to the present invention depend on various factors, they can be adjusted by changing the particle size and the quantity of particles which are added to the second layer composed of the above-mentioned polymer compound. It is preferable that the particle size and the quantity of the particles be determined in such a way that the particle size is 0.01 µm to 1 µm and the quantity is 0.01 wt % to 0.5 wt % of the second layer, further preferably the particle size is 0.1 µm to 1 µm and the quantity is 0.01 wt % to 0.3 wt %.

To make the thickness of the second layer to be 2 µm or smaller is one of means for adjusting the surface roughness. In a case where the quantity of added particles (wt %) is the same, an influence (in particular, an influence on the surface roughness SRa) of the particle size of the particles added to the second layer is excessively exerted if the thickness exceeds 2 µm. In this case, the surface roughness cannot satisfy the above-mentioned range. The reason for this is considered that influences of particles under the second layer are exerted on the surface shape.

Moreover, it is preferable that the surface of the first layer formed on the non-magnetic support member adjacent to the magnetic layer be a flow and smooth surface. From this viewpoint, it is sometimes preferable that no particles are included in the first layer. If the surface of the first layer is roughened, also the surface of the magnetic recording medium is roughened and thus the electromagnetic conversion characteristic deteriorates.

The present invention enables the surface roughness of the surface of the second layer to be made in such a way that SRa=3 nm to 12 nm and SRz=40 nm to 300 nm by arbitrarily adjusting the particle size and quantity of particles to be included in the second layer, the thickness of the second layer and the surface shape of the first layer.

The particles to be included in the second layer may be inorganic particles of, for example, calcium carbonate ($CaCO_3$), silica ($SiO_2$), alumina ($Al_2O_3$), titanium dioxide, kaolin, talc, graphite, feldspar, molybdenum disulfide, carbon black or barium sulfate. The particles are not limited to the inorganic particles. As an alternative to this, organic particles of, for example, polystyrene, polymethylmethacrylate, methylmethacrylate copolymer, a crosslinked substance of methylmethacrylate, polytetrafluoroethylene, polyvinylidene fluoride, polyacrylonitrile or benzoguanamine resin.

It is preferable that the surface (for example, the surface 7 shown in FIG. 4) of the first layer of the magnetic recording medium according to the present invention on which the magnetic layer of the non-magnetic support member is formed has the following shape by a known method (for example, addition of particles).

(1) Granular, crease-like or welt-like projections are formed and other projections higher than the welt-like projections are formed on the surface at a density of 10 to 10,000/mm².

(2) Crest-shape projections each having a height of 100 to 2000 Å are formed at an average density of 10,000 to 1,000,000/mm².

(3) Crest-shape projections each having a height of 50 to 600 Å are formed at an average density of $1 \times 10^5$ to $1 \times 10^8$/mm².

(4) A primer in the form of a continuous film is formed on the surface by coating and the film has small projections formed by resin containing particles each having a particle size of 0.1 μm or smaller as binders and small projections formed by only the resin.

The thin metal magnetic film for forming the magnetic layer of the magnetic recording medium according to the present invention may be a thin metal film which is formed by, for example, diagonal evaporation or vertical evaporation and main components of which are Co, Ni and Fe or a thin metal film, the main component of which is their alloy.

For example, any one of the following materials may be employed: ferromagnetic metal, such as Fe, Co or Ni, or ferromagnetic alloy, such as Fe—Co, Co—Ni, Fe—Co—Ni, Fe—Cu, Co—Cu, Co—Au, Co—Pt, Mn—Bi, Mn—Al, Fe—Co—Cr, Ni—Cr, Fe—Co—Cr, Co—Ni—Cr or Fe—Co—Ni—Cr. The employed material may be formed into a single-layered film or a multiple-layered film.

It is preferable that the thin metal magnetic film be a ferromagnetic thin film (a ferromagnetic thin film containing oxygen) obtainable in an ambiance atmosphere which is under the domination of oxygen gas in order to improve the adhesive strength with the non-magnetic support member (film) or to improve the corrosion resistance of the ferromagnetic thin metal film and wear resistance.

When the space between the non-magnetic support member and the thin metal magnetic film or the magnetic recording medium is in the form of a multi-layered structure, a ground layer or an intermediate layer may be formed in order to improve the adhesivity between the layers and to control the coercive force.

It is preferable that the thickness of the magnetic layer in the form of the thin metal magnetic film be 0.05 μm to 1 μm, more preferably 0.1 μm to 0.3 μm. If the thickness of the magnetic layer is reduced as described above, the self-demagnetization loss and the like can be prevented. The overall thickness of the magnetic recording medium can be reduced in addition to the reduction in the thickness of the non-magnetic support member so that the overall length of the magnetic recording medium is elongated which is accommodated in the supply reel or the like. Thus, elongation of the recording time and enlargement of the quantity of information can be realized.

If necessary, a backcoat layer may be formed on the reverse side (on the surface of the second layer opposite to the first layer) of the non-magnetic support member of the magnetic recording medium in the form of the thin metal film as indicated with a alternate long and short dash line 4 shown in FIG. 4.

As well known, the backcoat layer may be formed by dispersing a non-magnetic pigment, such as carbon or calcium carbonate in a binder, such as polyurethane or vinyl chloride-vinyl acetate copolymer.

It is preferable that means for forming the thin metal magnetic film be a vacuum evaporation method in which a ferromagnetic material is, under a vacuum state, heated and evaporated to be deposited on the non-magnetic support member. As an alternative to this, a so-called PVD method may be employed which is exemplified by an ion plating method in which evaporation of the ferromagnetic material is performed in an electric discharge state and a sputtering method in which glow discharge is caused to take place in an ambient atmosphere, the main component of which is argon to force atoms in the surface of the target to be discharged with generated argon ions.

When lubricant 3 is caused to exist on the surface of the thin metal magnetic film as indicated with, for example, an alternate long and short dash line shown in FIG. 4, the magnetic recording medium according to the present invention is able to improve the moving characteristic thanks to the shape of the particle projections of the magnetic material.

If necessary, a variety of additives, such as a rust-preventive agent and antistatic agent, may be allowed to exist on the right side, reverse side and portion adjacent to the right and reverse sides of the magnetic recording medium according to the present invention, in the gaps of the ferromagnetic thin metal film, on the interface between the ferromagnetic thin metal film and the non-magnetic support member and in the non-magnetic support member.

Figure 5:
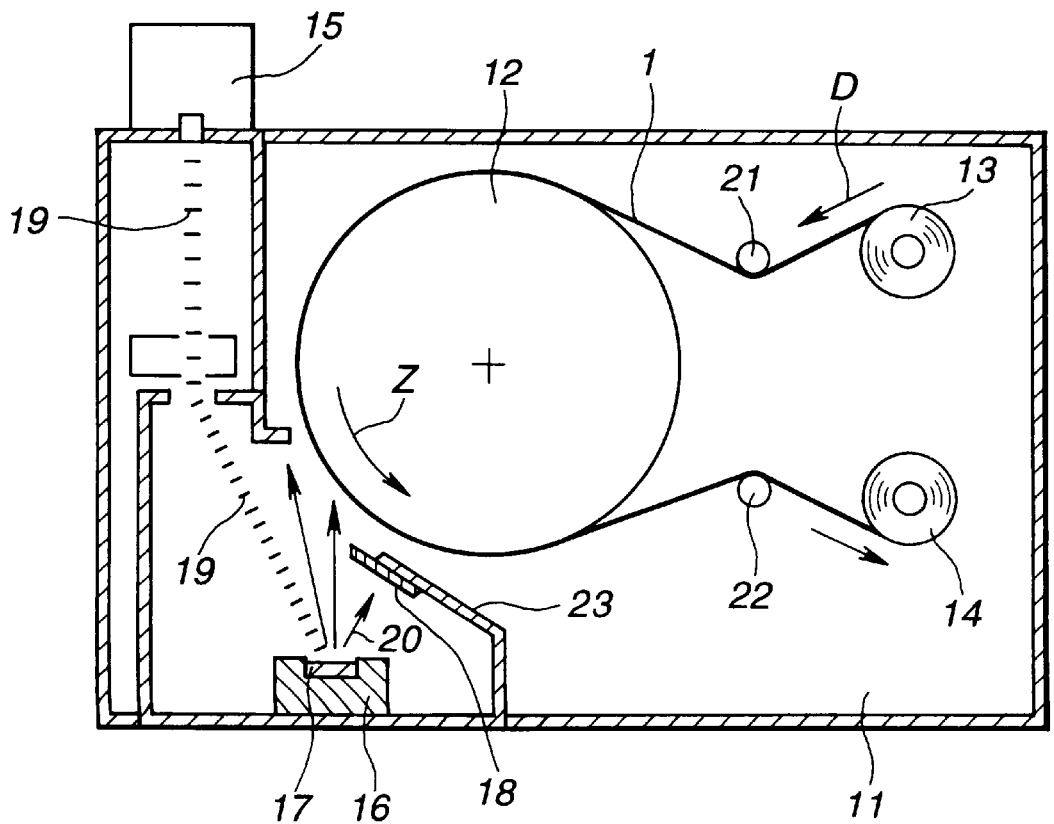
FIG. 5 is a schematic cross sectional view showing a continuous winding type vacuum evaporation apparatus which can be used to manufacture the magnetic recording medium according to the present invention.

FIG. 5 is a schematic view showing the structure of a continuous winding type vacuum evaporation apparatus for forming the ferromagnetic thin metal film applicable to the present invention.

The continuous winding type vacuum evaporation apparatus is formed into a so-called diagonal evaporation apparatus including an evaporation source 17 disposed in a vacuum chamber 11 having a vacuum inner portion (for example, about $10^{-3}$ Pa) at a position opposite to a cooling can 12 arranged to be rotated counterclockwise when viewed in FIG. 5 (in a direction indicated by an arrow Z) and cooled to, for example, −20° C.

The non-magnetic support member 1 is moved forwards in a direction indicated by an arrow D from a supply roll 13 arranged to be rotated counterclockwise when viewed in FIG. 5 so as to be moved along the outer surface of the cooling can 12. In this state, an evaporation material 20 heated and evaporated by an electron beam 19 is supplied from an evaporation source 17 to be allowed to adhere to the non-magnetic support member 1 so that the thin metal magnetic film is formed by evaporation. Then, the non-magnetic support member 1 is wound around a winding roll 14.

Guide rollers 21 and 22 are respectively disposed between the supply roll 13 and the cooling can 12 and between the cooling can 12 and the winding roll 14. Thus, a predetermined tension is applied to the non-magnetic support member 1 which moves in a region from the supply roll 13 to the cooling can 12 and a region from the cooling can 12 to the winding roll 14 to cause the non-magnetic support member 1 to be moved smoothly.

The evaporation source 17 is in the form of a container (for example, a crucible) 16 containing the above-mentioned thin metal magnetic film, for example, the Co—Ni alloy. The evaporation source 17 (the metal magnetic material) is irradiated with accelerated electron beam 19 from an electron-beam generation source 15 so that the evaporation material 20 is heated and evaporated. The evaporation material 20 is allowed to adhere to the surface of the non-magnetic support member 1 which is moved along the outer surface of the cooling can 12 so that the thin metal magnetic film is formed and thus the magnetic recording medium is manufactured. At this time, an application-preventive plate 23 and a shutter 18, the position of which can be adjusted, are disposed between the evaporation source 17 and the cooling can 12 to permit only evaporated particles which are made incident at a predetermined angle from the non-magnetic support member 1 to pass through. Thus, the thin metal magnetic film is formed by the diagonal evaporation method.

When the thin metal magnetic film is formed by evaporation, oxygen gas is supplied to the surface of the non-magnetic support member 1 through an oxygen gas introduction port (not shown) to improve the magnetic characteristic, durability and the weather resistance of the thin metal magnetic film. To heat the evaporation source 17, a known heating means may be employed, for example, resistance heating means, high-frequency heating means or laser heating means in place of the heating means using the electron beam.

EXAMPLES

Examples of the present invention will now be described. Note that the present invention is not limited to the examples below.

Manufacture of Non-Magnetic Support Member

A non-magnetic support member mainly composed of polyethylene terephthalate (PET) was manufactured by the following method.

Examples 1 to 11

As a raw material for forming the first layer of the non-magnetic support member (the composite film) in the form of a laminate, substantially non-oriented and non-crystal polyethylene terephthalate (PET) was manufactured which did not contain internal particles which were generated from the residue of the polymerization catalyst as much as possible. A raw material for the second layer was manufactured by causing $SiO_2$ and $CaCO_3$ (the particle size of each particles was 0.1 $\mu$m to 1 $\mu$m) by 0.01 wt % to 0.3 wt % to be contained in substantially non-oriented and non-crystal polyethylene terephthalate (PET) which did not contain internal particles which were generated from the residue of the polymerization catalyst as much as possible, similarly to the raw material for the first layer. The raw materials for the first and second layers were melted and extruded to the surface of the rotational drum, the temperature of which was maintained at about 20° C. so as to be drawn in the longitudinal direction by 3.4 times at 90° C. Then, a coating solution having the following composition was applied to the surface of the first layer of the uniaxial oriented film by a roll coating method so that a undercoat layer was formed.

Composition of Coating Solution for Undercoat

| | |
|---|---|
| 1.5 wt % solution of acryl-polyester resin (manufactured by Takamatu) | 80 parts by weight |
| 1.5 wt % solution of $SiO_2$ having an average particle size of 0.02 $\mu$m | 6 parts by weight |
| polyoxyethylenenonylphenyl ether (manufactured by Nihon Yushi) | 16 parts by weight |

Then, sequential biaxial orientation in the lateral direction was performed by 3.4 times at 105° C. to that the non-magnetic support member (the composite film in the form of the laminate) was obtained which had an overall thickness of 8 $\mu$m composed of the second layer having a thickness of 2 $\mu$m and the first layer having a thickness of 6 $\mu$m.

In Examples 1 to 11, the particle sizes (0.1 $\mu$m to 1 $\mu$m) of $SiO_2$ and $CaCO_3$ to be added to the second layer and the quantity (0.01 wt % to 0.3 wt %) of the same were adjusted so that the surface roughness SRa and the surface roughness SRz of the surface (the surface 5 shown in FIG. 4) of the second layer were adjusted to be values shown in the following Table 1. In this case, the thicknesses (the total thickness of the first and second layers which was hereinafter applied) of the non-magnetic support members and the second layers were the same except for the surface roughness SRa and the surface roughness SRz.

Examples 12 to 14

A non-magnetic support member having a second layer to which particles having a composition and quantity (wt %) similar to those of Example 5 were added was manufactured except for the thickness of the non-magnetic support member and that of the second layer being changed. Also the surface roughness SRa, the surface roughness SRz, the thickness of the non-magnetic support member and the thickness of the second layer of Examples 12 to 14 were shown in the following Table 1.

Example 15

A non-magnetic support member was manufactured in such a way that the undercoating layer having the above-mentioned composition was not formed on the surface (the surface 7 shown in FIG. 4) of the first layer of Example 5 and the other structures were similar to Example 5. Also the surface roughness SRa, the surface roughness SRz, the thickness of the non-magnetic support member and the thickness of the second layer of Example 15 were shown in the following Table 1.

The surface roughness SRa and the surface roughness SRz of the non-magnetic support members according to Examples 1 to 15 were measured by using a surface roughness meter "ET-30HK" manufactured by Kosaka under condition that the diameter of a probe was 2 μmR, the pressure of the probe was 10 mg, the cutoff value was 0.25 mm, the x-directional measuring length was 0.8 mm and the y-directional measuring length was 0.02 μm.

[TABLE 1]

| Example | The surface roughness of the second layer Sra (nm) | Srz (nm) | The thickness of the non-magnetic support member (μm) | The thickness of the second layer (μm) |
|---|---|---|---|---|
| 1 | 3.2 | 48 | 8 | 2 |
| 2 | 3.8 | 295 | 8 | 2 |
| 3 | 11.8 | 42 | 8 | 2 |
| 4 | 11.5 | 290 | 8 | 2 |
| 5 | 7.0 | 150 | 8 | 2 |
| 6 | 2.0 | 30 | 8 | 2 |
| 7 | 12.3 | 310 | 8 | 2 |
| 8 | 14.0 | 250 | 8 | 2 |
| 9 | 11.0 | 310 | 8 | 2 |
| 10 | 2.0 | 100 | 8 | 2 |
| 11 | 7.0 | 30 | 8 | 2 |
| 12 | 7.2 | 153 | 6 | 2 |
| 13 | 6.3 | 148 | 8 | 1 |
| 14 | 7.3 | 155 | 8 | 4 |
| 15 | 7.1 | 152 | 8 | 2 |

Manufacture of Evaporation Tape

An evaporation tape was manufactured by evaporating the ferromagnetic thin metal film serving as the magnetic layer on each of the non-magnetic support members according Examples 1 to 15. Conditions under which the evaporation tape was manufactured were shown below.

As an apparatus for evaporating the ferromagnetic thin metal film on the non-magnetic support member, the continuous winding type vacuum evaporation apparatus shown in FIG. 5 was employed. Note that the degree of vacuum was $10^{-3}$ Pa. Moreover, a Co—Ni ferromagnetic thin metal film was, under existence of oxygen gas in a small quantity, formed on each 6000m of the non-magnetic support members according to Examples 1 to 15 by the continuous vacuum and diagonal evaporation method. The evaporation was performed by making an incidental angle to be 90° to 45°. The moving speed (the conveying speed) for the non-magnetic support member was 25 m/minute and the thickness of the ferromagnetic thin metal film was 0.2 μm.

Then, a backcoat layer in the form of a mixed system composed of carbon black and urethane binder was applied to have a thickness of 0.5 μm, and then perfluoropolyether serving as lubricant was applied to the surface of the magnetic layer to have a thickness of 0.001 μm, after which the evaporated tape was wound into a roll form.

Shape of Winding Roll

The shape of the roll (the original) at this time was evaluated to give three marks as ○, Δ and X to determine the workability (the handling easiness).

○: no crease was observed

Δ: 0 to 10 creases were observed

X: 10 or more creases were observed

Evaluation of Evaporation Tape

Then, the evaporation tape was cut (slitted) to have a width of 8 mm, and then loaded into an 8 mm cassette. The electromagnetic conversion characteristic, dropouts and durability against movement of the thus-manufactured evaporation tape were evaluated as follows by using a high-band 8 mm video deck "EV-900" manufactured by Sony (note that the relative velocity was 3.8 m/second and the recording frequency was 7 MHz).

Electromagnetic Conversion Characteristic (dB): the S/N ratio of the video signal was measured in comparison to that of the Hi-8 (mm) metal tape manufactured by Sony which was assumed to be 0 dB.

Dropout (number/minute): a dropout counter was used to count dropouts exceeding damping of a reproduction output of −16 dB and a length of 10 μsec.

Durability against Movement (Damping of Output: dB): the tape was moved for reproduction one hundred times to detect reduction (damping) of the output from the initial output after the movement.

The influence of transcription of the reverse side of the second layer was detected by examining the foregoing characteristics of the surface portion (outside) and the core portion (inside) of the roll shape film. Results were shown in the following Table 2.

Figure 1:
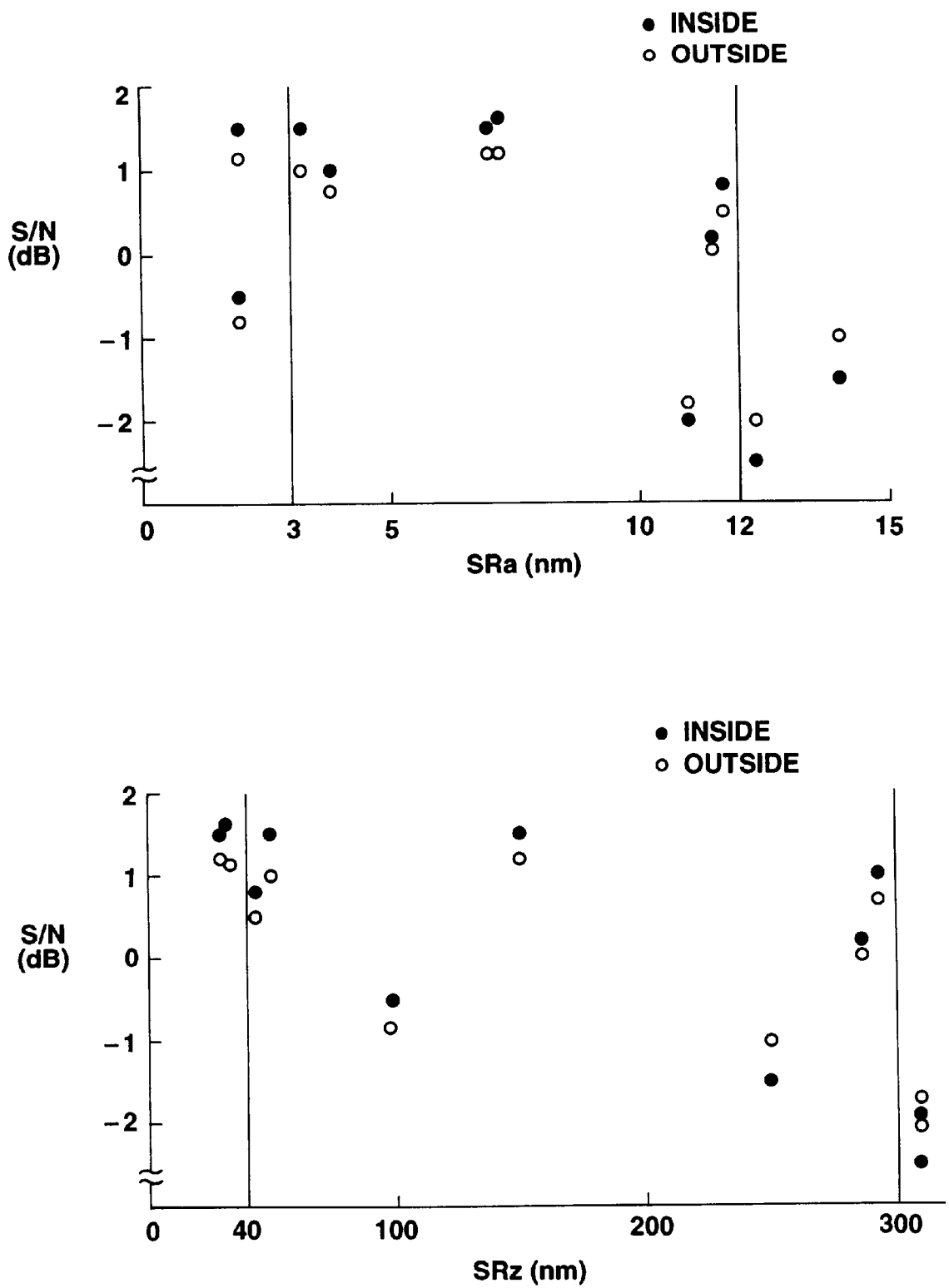
FIG. 1 shows a graph of S/N ratios with respect to surface roughness SRa of the second layer which is the reverse side of a non-magnetic support member and a graph of S/N ratios with respect to surface roughness SRz.
Figure 2:
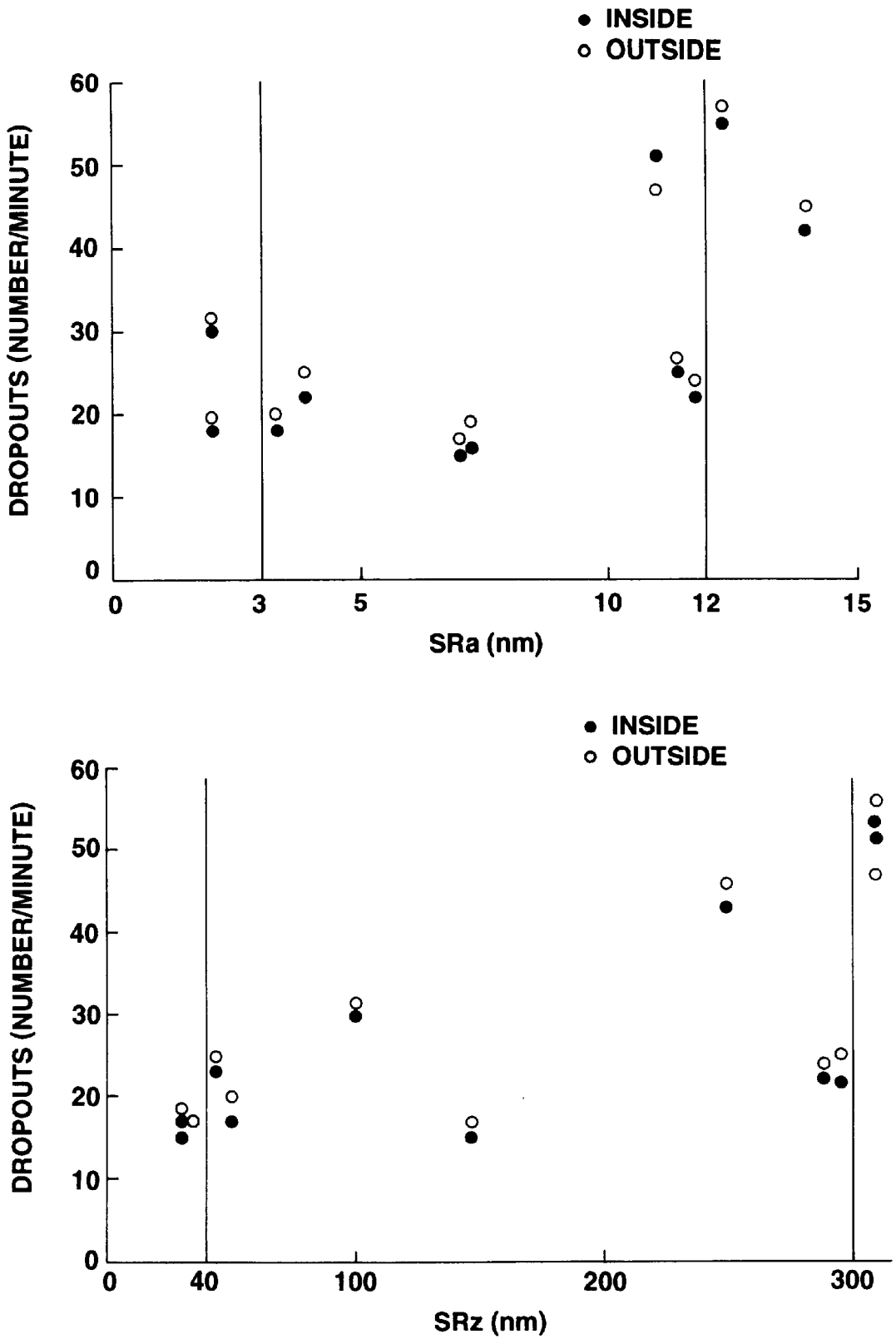
FIG. 2 shows a graph of the number of dropouts with respect to the surface roughness SRa and a graph of the number of dropouts with respect to the surface roughness SRz.
Figure 3:
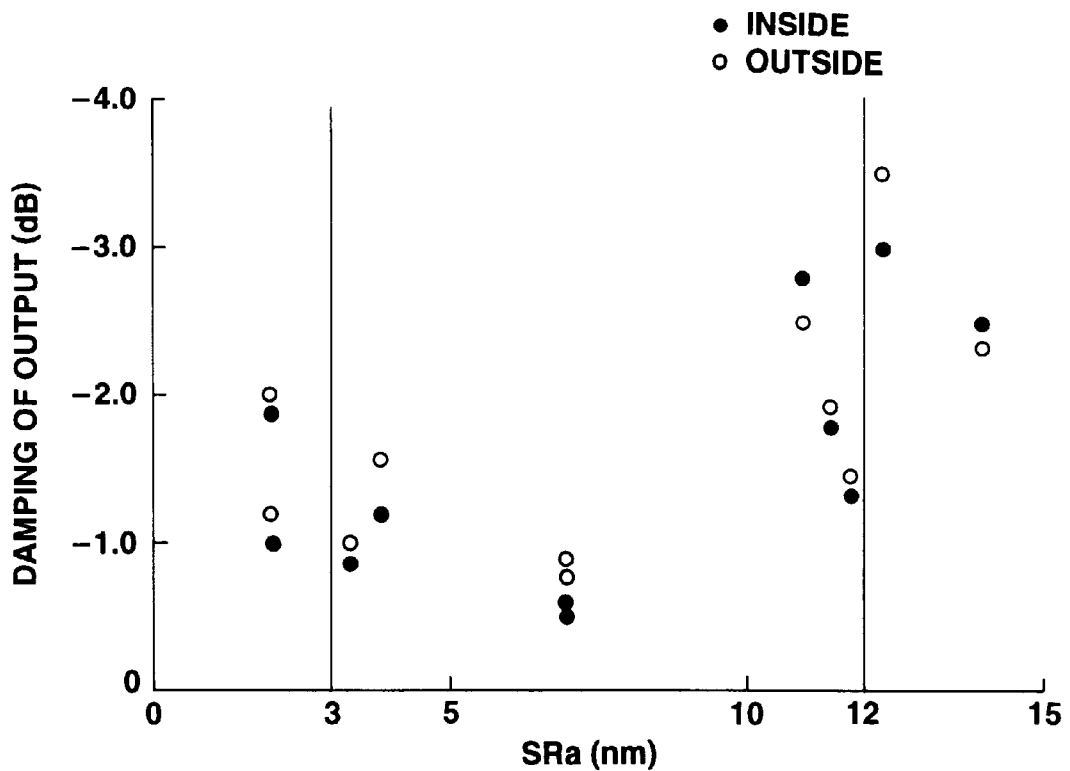
FIG. 3 is a graph of the values of durability against movement with respect to the surface roughness SRa and a graph of the values of the durability against movement with respect to the surface roughness SRz.
Figure 3:
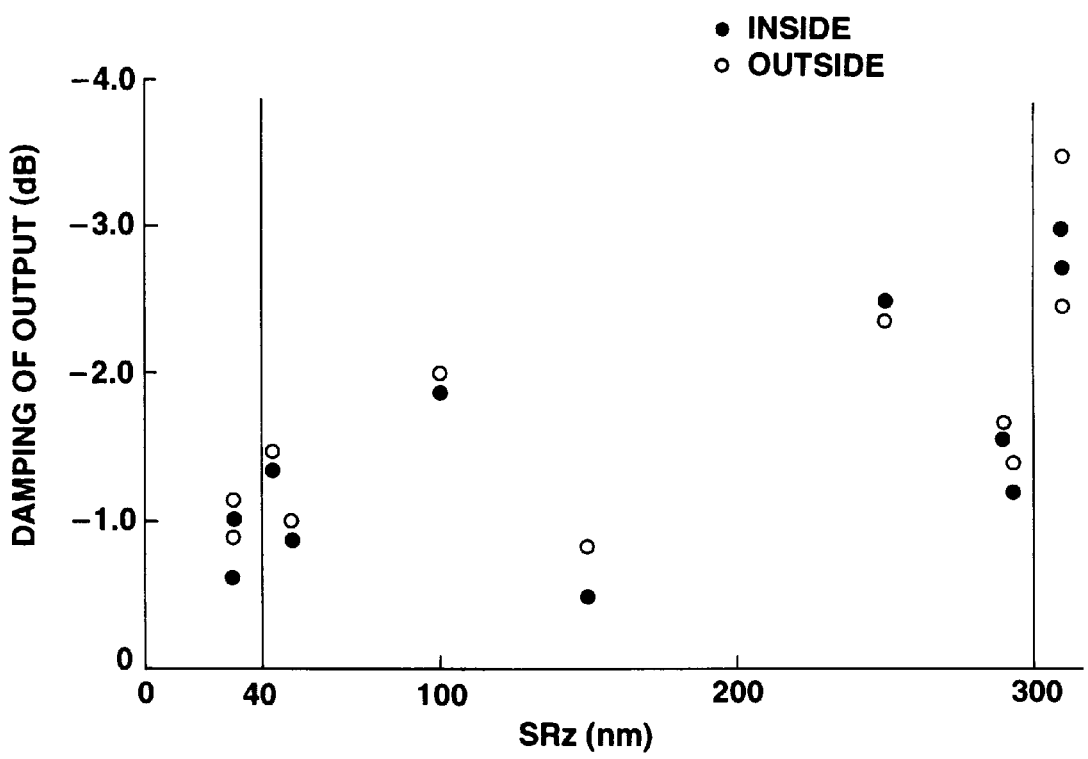

A graph showing change in the S/N ratio with respect to the surface roughness SRa and a graph showing change in the S/N ratio with respect to the surface roughness SRz are shown in FIG. 1, a graph showing change in the dropout with respect to the surface roughness SRa and a graph showing change in the dropout with respect to the surface roughness SRz are shown in FIG. 2, and a graph showing change in the durability against movement (damping of the output) with respect to the surface roughness SRa and a graph showing change in the durability against movement (damping of the output) with respect to the surface roughness SRz are shown in FIG. 3. Note that the foregoing graphs show sample tapes according to Examples 1 to 11.

[TABLE 2A]

| Example | Inside or outside of the roll | S/N ratio (dB) | Dropouts (no./min) | Durability against Movement (Damping of Output: dB) | The shape of the roll |
|---|---|---|---|---|---|
| 1 | Inside | 1.5 | 18 | −0.9 | ○ |
|   | Outside | 1.0 | 20 | −1.0 |   |
| 2 | Inside | 1.0 | 22 | −1.2 | ○ |
|   | Outside | 0.8 | 25 | −1.5 |   |
| 3 | Inside | 0.8 | 22 | −1.3 | ○ |
|   | Outside | 0.5 | 24 | −1.4 |   |
| 4 | Inside | 0.2 | 25 | −1.7 | ○ |
|   | Outside | 0.1 | 26 | −1.8 |   |
| 5 | Inside | 1.5 | 15 | −0.5 | ○ |
|   | Outside | 1.2 | 17 | −0.8 |   |
| 6 | Inside | 1.5 | 18 | −1.0 | X |
|   | Outside | 1.2 | 19 | −1.1 |   |
| 7 | Inside | −2.5 | 55 | −3.0 | ○ |
|   | Outside | −2.0 | 57 | −3.5 |   |
| 8 | Inside | −1.5 | 42 | −2.5 | ○ |
|   | Outside | −1.0 | 45 | −2.4 |   |
| 9 | Inside | −2.0 | 51 | −2.8 | ○ |
|   | Outside | −1.8 | 47 | −2.5 |   |
| 10 | Inside | −0.5 | 30 | −1.9 | Δ |
|   | Outside | −0.8 | 31 | −2.0 |   |
| 11 | Inside | 1.6 | 16 | −0.6 | X |
|   | Outside | 1.2 | 18 | −0.9 |   |

[TABLE 2B]

| Example | Inside or outside of the roll | S/N ratio (dB) | Dropouts (no./min) | Durability against Movement (Damping of Output: dB) | The shape of the roll |
|---|---|---|---|---|---|
| 12 | Inside | 1.6 | 15 | −0.8 | ◯ |
|    | Outside | 1.2 | 18 | −1.0 | |
| 13 | Inside | 1.7 | 17 | −0.6 | ◯ |
|    | Outside | 1.2 | 18 | −0.8 | |
| 14 | Inside | 1.2 | 15 | −0.5 | ◯ |
|    | Outside | 1.0 | 18 | −0.7 | |
| 15 | Inside | 2.0 | 12 | −0.5 | ◯ |
|    | Outside | 1.9 | 13 | −0.6 | |

Results

As can be understood from Examples 1 to 11 and FIGS. 1 to 3, the shape of the roll, the handling easiness, the electromagnetic conversion characteristic (the S/N ratio), dropout and durability against movement can be improved when the surface roughness SRa is in a range from 3 nm to 12 nm. Although the sample tapes according to Examples 6 and 10 sometimes result in excellent electromagnetic conversion characteristic (S/N ratio), dropouts and durability against movement (damping of the output), the small surface roughness SRa deteriorates the roll shape. Thus, the satisfactory workability (the handling easiness) cannot easily be realized.

As can be understood from Examples 1 to 11 and FIGS. 1 to 3, excellent effects similar to the foregoing examples can be obtained when the surface roughness SRz is in a range from 40 nm to 300 nm. Similarly to the surface roughness SRa, the sample tapes according to Example 6 and 10 sometimes result in excellent electromagnetic conversion characteristic (the S/N ratio), dropouts and durability against movement. However, the satisfactory roll shape cannot be formed and excellent workability (the handling easiness) cannot easily be realized because SRa and/or SRz is too small.

The sample tapes according to the present invention and having the surface roughness SRa in the range from 3 nm to 12 nm and the surface roughness SRz in the range from 40 nm to 300 nm enable excellent results in an excellent electromagnetic conversion characteristic (the S/N ratio), dropout and the durability against movement being obtained. Moreover, also excellent roll shape (the shape of the original) can be obtained and satisfactory workability (the handling easiness) can be realized.

On the other hand, the sample tape according to Example 6, having too small surface roughness SRa and the surface roughness SRz, cannot realize a satisfactory roll shape (the shape of the original) and the workability (the handling easiness) is unsatisfactory. Also the sample tapes according to Examples 10 and 11, having too small surface roughness SRa and the surface roughness SRz, a satisfactory roll shape (the shape of the original) cannot be realized and the workability (the handling easiness) is unsatisfactory though the degree is superior to the sample tape according to Example 6. It can be considered that the reason for this lies in that the too smooth and flat surface of the magnetic tape permits existence of air between tapes when the tape has been formed into the roll although transcription (printing of the reverse side) of the roughness to the surface of the magnetic layer can be prevented because the surface of the second layer (the surface 5 shown in FIG. 4) is relatively flat and smooth. Thus, air causes creases to be formed.

When both surface roughness SRa and the surface roughness SRz are too large as those of Example 7, the electromagnetic conversion characteristic (the S/N ratio), dropout and the durability against movement considerably deteriorate. It can be considered that the reason for this lies in that the too rough second layer (the surface 5 shown in FIG. 4) causes transcription of the roughness to the surface of the magnetic layer and printing to take place and thus the electromagnetic conversion characteristic deteriorates. The sample tapes according to Examples 8 and 9 having too large surface roughness SRa or the surface roughness SRz encounters printing (transcription of the roughness of the reverse side) of the roughness to the surface of the magnetic layer. Thus, the electromagnetic conversion characteristic deteriorates.

The sample tape according to Example 12 has the structure that the thickness of the first layer is reduced and the overall thickness of the non-magnetic support member is reduced to 6 μm. Since the surface roughness SRa and the surface roughness SRz are in proper ranges, an excellent electromagnetic conversion characteristic can be obtained and a satisfactory roll shape (that is, the workability) can be realized.

The sample tapes according to Examples 5 to 12 having the surface roughness SRa and the surface roughness SRz of the second layer in the ranges that SRa=3 nm to 12 nm and SRz=40 nm to 300 nm enable the overall thickness of the non-magnetic support member to be satisfactorily reduced to 8 μm and finally 6 μm. Therefore, the recording time can be elongated and the quantity of information can be enlarged.

The sample tape according to Example 13 manufactured in such a way that the particle size and the quantity of particles to be contained in the second layer are the same as those of the sample tape according to Example 5 and the thickness of the second layer is made to be 1 μm. The sample tape according to Example 14 has the structure that the thickness of the second layer is made to be 4 μm. As can be understood from the sample tape according to Example 14, somewhat enlargement of the second layer causes the influence of the particles contained in the second layer to be exerted considerably. All of the foregoing sample tapes have excellent electromagnetic conversion characteristic, durability against movement and workability.

As a matter of course, the surface roughness SRa is required to be in a range from 3 nm to 12 nm and the surface roughness SRz is required to be in a range from 40 nm to 300 nm by adjusting the quantity and particle size of the particles to be contained in the second layer.

The sample tape according to Example 15 has the structure that the undercoating layer having the above-mentioned composition is omitted from the surface (the surface 7 shown in FIG. 4) of the first layer. Although the influence of the shape of the surface of the first layer is exerted on the surface of the magnetic layer, the quantity and particle size of the particles to be contained in the second layer and the thickness of the second layer are required to be arbitrarily adjusted to make the surface roughness SRa to be in a range from 3 nm to 12 nm and the surface roughness SRz to be in a range from 40 nm to 300 nm.

The magnetic recording medium according to the present invention has the structure that the non-magnetic support member is in the form of a laminate composed of the first layer and the second layer, the magnetic layer is formed on the first layer and the surface roughness of the surface of the second layer opposite to the surface on which the first layer is formed is made in such a way that SRa is in a range from 3 nm to 12 nm and SRz is in a range from 40 nm to 300 nm. Therefore, satisfactory workability (the handling easiness) can be realized in the process for manufacturing the non-magnetic support member and the magnetic recording medium. Moreover, deterioration in the surface characteristic of the magnetic layer caused from transcription of the surface roughness of the surface of the second layer opposite to the surface, on which the first layer is formed, to the surface of the magnetic layer can be prevented so that a magnetic recording medium of a thin metal magnetic film type having both excellent electromagnetic conversion characteristic and moving characteristic is provided.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A magnetic recording medium comprising:

a multi-layer non-magnetic support member having an overall thickness of less than or equal to 8 μm and including a first layer having an upper surface and an opposed lower surface and a second layer having an upper surface and an opposed lower surface, the lower surface of the first layer being disposed adjacent the upper surface of the second layer, the second layer having a thickness of less than or equal to 4 μm;

a metal magnetic thin film layer disposed on the upper surface of the first layer; and a back coat layer comprising carbon black and a urethane binder disposed on the lower surface of the second layer, wherein the lower surface of the second layer has a surface roughness SRa=3 nm to 12 nm and a surface roughness SRz=40 nm to 300 nm.

2. A magnetic recording medium according to claim 1, wherein the thickness of said second layer is 2 μm or smaller.

3. A magnetic recording medium according to claim 1, wherein particles are added to said second layer so that said surface roughness is adjusted.

4. A magnetic recording medium according to claim 3, wherein the particle size of the particles is 0.01 μm to 1 μm and the quantity is 0.01 wt % to 0.5 wt % of said second layer.

5. A magnetic recording medium according to claim 1, wherein the upper surface of said first layer adjacent to said magnetic metal thin film layer is a flat and smooth surface.

6. A magnetic recording medium according to claim 1, wherein the thickness of said magnetic metal thin film layer is 0.05 μm to 1 μm.

7. A magnetic recording medium as defined in claim 1, further comprising an under coat layer comprising an acryl-polyester resin, $SiO_2$ particles having a particle size of about 0.02 μm and a polyoxyethylenenonylphenyl ether disposed on said upper surface of the first layer, between the first layer and the magnetic metal thin film layer.

8. A magnetic recording medium as defined in claim 1, further comprising a lubricant layer disposed on said magnetic metal thin film layer opposite the upper surface of the first layer.

9. A magnetic recording medium as defined in claim 1, wherein the first layer is substantially particle free.

* * * * *